US010392183B2

(12) United States Patent
Link

(10) Patent No.: US 10,392,183 B2
(45) Date of Patent: Aug. 27, 2019

(54) FUNNEL STORAGE SYSTEMS

(71) Applicant: Christopher Joseph-Paul Link, Tioga, ND (US)

(72) Inventor: Christopher Joseph-Paul Link, Tioga, ND (US)

( * ) Notice: Subject to any disclaimer, the term of this patent is extended or adjusted under 35 U.S.C. 154(b) by 33 days.

(21) Appl. No.: 15/615,712

(22) Filed: Jun. 6, 2017

(65) Prior Publication Data

US 2017/0349366 A1 Dec. 7, 2017

Related U.S. Application Data

(60) Provisional application No. 62/346,204, filed on Jun. 6, 2016.

(51) Int. Cl.

| | |
|---|---|
| ***B67C 11/02*** | (2006.01) |
| ***B65D 85/20*** | (2006.01) |
| ***B65B 3/04*** | (2006.01) |
| ***B09B 3/00*** | (2006.01) |
| ***B25H 3/00*** | (2006.01) |
| *B65B 39/00* | (2006.01) |

(52) U.S. Cl.

CPC ................ *B65D 85/20* (2013.01); *B09B 3/00* (2013.01); *B25H 3/006* (2013.01); *B65B 3/04* (2013.01); *B67C 11/02* (2013.01); *B65B 39/00* (2013.01)

(58) Field of Classification Search

CPC ......... B65D 85/20; B67C 11/02; B67C 11/00; B67C 2011/022; B67C 9/00; B65B 39/00; B65B 3/04; B09B 3/00; B25H 3/006; F16N 33/00; F16N 2033/005; A47L 13/51; A47L 13/512; A47L 19/02; A47L 19/04; A47L 19/505; A47B 67/02; A47B 73/004

USPC .......... 312/229, 228.1, 209, 210, 210.5, 211, 312/212, 213; 141/107

See application file for complete search history.

(56) References Cited

U.S. PATENT DOCUMENTS

| | | | | | |
|---|---|---|---|---|---|
| 92,791 | A * | 7/1869 | Burwell | | |
| 205,665 | A * | 7/1878 | Miller | | |
| 478,303 | A * | 7/1892 | Allgood | | |
| 1,850,524 | A * | 3/1932 | Whittaker | A61L 2/00 | 312/209 |
| 2,660,313 | A * | 11/1953 | James | C11B 3/008 | 210/323.1 |
| 3,654,969 | A * | 4/1972 | Vazquez | B67B 7/26 | 141/106 |
| 3,937,236 | A * | 2/1976 | Runnells | B08B 3/12 | 134/184 |
| 3,955,682 | A * | 5/1976 | Baren | B01L 9/00 | 211/74 |

(Continued)

*Primary Examiner* — Daniel J Troy
*Assistant Examiner* — Timothy M Ayres
(74) *Attorney, Agent, or Firm* — Kali Law Group, P.C

(57) ABSTRACT

Funnel storage systems are presented including: a cabinet enclosure having an upper opening; a lid removably coupled with the cabinet enclosure, the lid forming a dust seal with the cabinet enclosure; a top screened support coupled with the cabinet enclosure for receiving a number of funnels; and a bottom screened support coupled with the cabinet enclosure for storing and organizing the number of funnels along a number of upright storage posts. In some embodiments, the cabinet enclosure further includes angled side walls such that a second cabinet enclosure having angled side walls may be nested within the cabinet enclosure.

11 Claims, 4 Drawing Sheets

(56) References Cited

U.S. PATENT DOCUMENTS

| | | | | | |
|---|---|---|---|---|---|
| 5,098,663 | A * | 3/1992 | Berthold | B01L 9/06 | 422/561 |
| 5,261,541 | A * | 11/1993 | Li | A47G 25/12 | 211/62 |
| D375,874 | S | 11/1996 | Chrisco | | |
| 5,611,377 | A * | 3/1997 | Maguire | B01D 41/04 | 141/106 |
| 5,884,676 | A * | 3/1999 | Sage | F16N 31/002 | 141/106 |
| 5,938,049 | A * | 8/1999 | Susholz | A45B 25/28 | 211/62 |
| 6,050,660 | A * | 4/2000 | Gurley | B25H 3/028 | 280/47.26 |
| 6,763,861 | B2 | 7/2004 | Saks | | |
| 7,431,056 | B1 | 10/2008 | Smith | | |
| 8,752,914 | B1 * | 6/2014 | Simhoni | A47B 51/00 | 312/229 |
| 2011/0094622 | A1 | 4/2011 | McLoy | | |

* cited by examiner

FUNNEL STORAGE SYSTEMS

BACKGROUND

A primary function of a funnel is to transfer fluid into a container. One problem associated with this function is that after using the funnel, fluid residue from the transfer may remain on the sidewalls of the funnel. This fluid residue has the potential to collect dust, sawdust, metal shavings, or other misc debris in an active work environment. As a result, the funnel generally must be thoroughly cleaned before each use in order to transfer clean fluid. Additionally, because of fluid residue, funnels that are left out after use can drip fluid on other surfaces creating, at best, an unsightly mess and, at worst, a hazardous environment.

Current systems lack the ability to both allow funnels to drain as well as to provide a safe and clean storage solution for funnels. As such funnel storage systems are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, funnel storage systems are presented including: a cabinet enclosure having an upper opening; a lid removably coupled with the cabinet enclosure, the lid forming a dust seal with the cabinet enclosure; a top screened support coupled with the cabinet enclosure for receiving a number of funnels; and a bottom screened support coupled with the cabinet enclosure for storing and organizing the number of funnels along a number of upright storage posts. In some embodiments, the cabinet enclosure further includes angled side walls such that a second cabinet enclosure having angled side walls may be nested within the cabinet enclosure. In some embodiments, the cabinet enclosure further includes: a hanging element positioned along a back panel of the cabinet enclosure such that the funnel storage system may be mounted on a vertical surface, where the hanging element is selected from the group consisting of: a magnet, a side hanging tab, and a back hanging tab. In some embodiments, the lid further includes a hinged joint positioned forward from a back edge of the lid. In some embodiments, the lid is vented. In some embodiments, the cabinet enclosure is vented. In some embodiments, the top screened support further includes one or more pre-cut openings for receiving a funnel and for maintaining the funnel in a stable vertical orientation such that fluids are drained from the funnel. In some embodiments, systems further include: a drawer slidingly coupled with the cabinet enclosure for receiving drained fluids.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Embodiments disclosed herein provide a funnel storage system that may be conveniently attached to many surfaces such as wall or other vertical surface using hardware, adhesives, magnets, etc. In addition, embodiments may be placed on a horizontal surface. Embodiments provide a storage solution that fully encloses a number of funnels, thus protecting them from debris and keeping them neatly stored for future use. As disclosed herein, a funnel refers to a transfer device that may come in a variety of shapes and sizes without departing from embodiments disclosed herein. After using a funnel, the funnel may be placed in funnel storage system embodiments. Any fluid or solids remaining in the funnel may drain over time into the bottom of the funnel storage system and later emptied through a closable orifice or opening when desired. Funnels stored inside funnel storage system embodiments may be sprayed with cleaners or other fluid medium and left to drip dry. When the funnels are placed in funnel storage system embodiments with the lid is closed, the funnels remain clean in an otherwise potentially dirty industrial environment. Funnel storage container embodiments may include a lid or side wall access door that may be opened for access to funnels.

Figure 1:
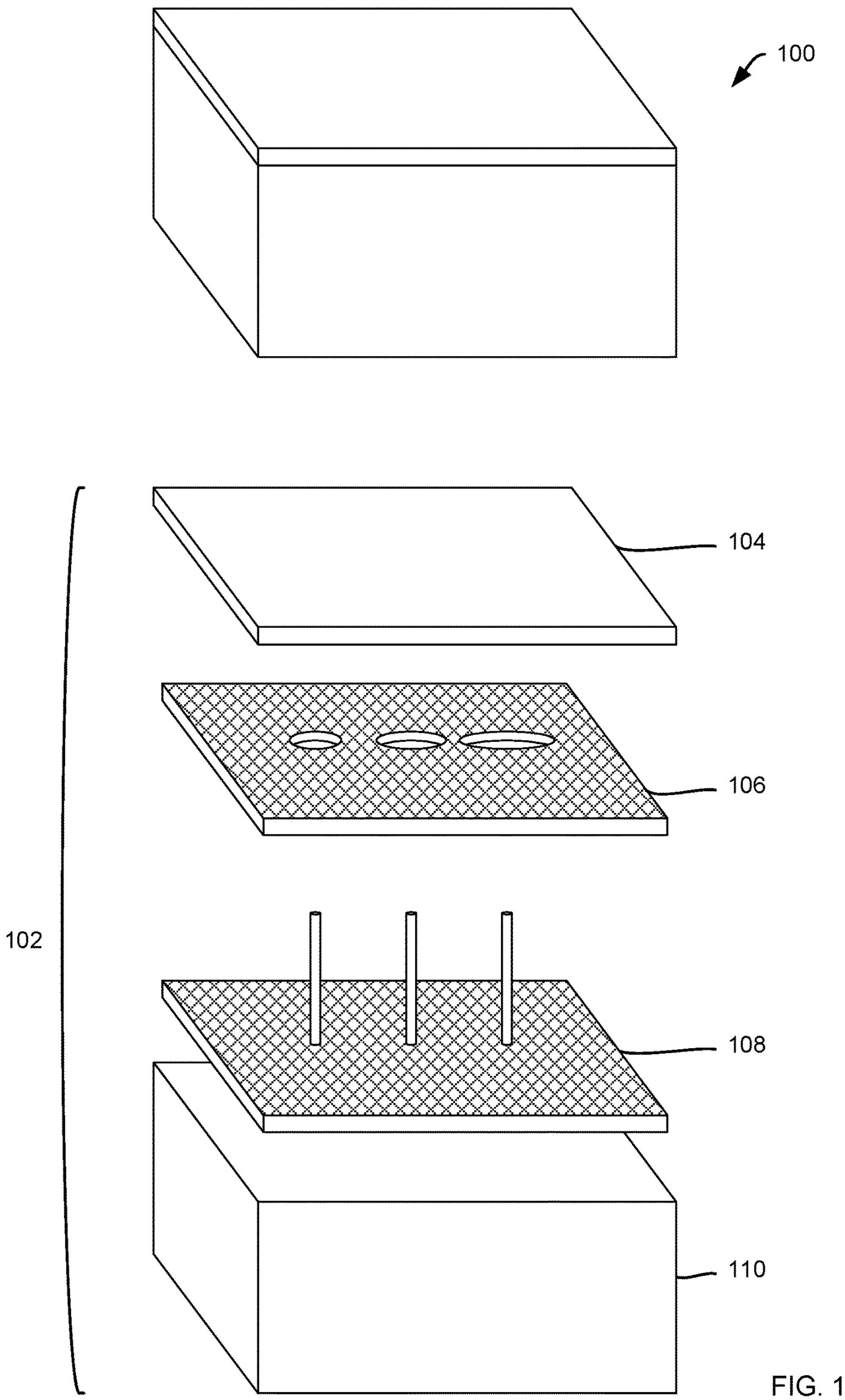
FIG. 1 is an illustrative representation of a funnel storage system and exploded funnel storage system in accordance with embodiments of the present invention.

FIG. 1 is an illustrative representation of a funnel storage system 100 and exploded funnel storage system 102 in accordance with embodiments of the present invention. Funnel storage system 100 is closed and may include a number of elements as illustrated by exploded funnel storage system 102. For example, as illustrated, funnel storage system embodiments may include lid 104 removably coupled with cabinet enclosure 110. Lid and cabinet enclosure embodiments will be discussed in further detail below for FIG. 2. In addition, as illustrated, funnel storage systems embodiments may include top screened support 106 that may be coupled with cabinet enclosure 110. Top screened support embodiments will be discussed in further detail below for FIG. 3. Further illustrated, funnel storage system embodiments may include bottom screened support 108 removably coupled with cabinet enclosure 110. Bottom screened support embodiments will be discussed in further detail below for FIG. 4.

Figure 2:
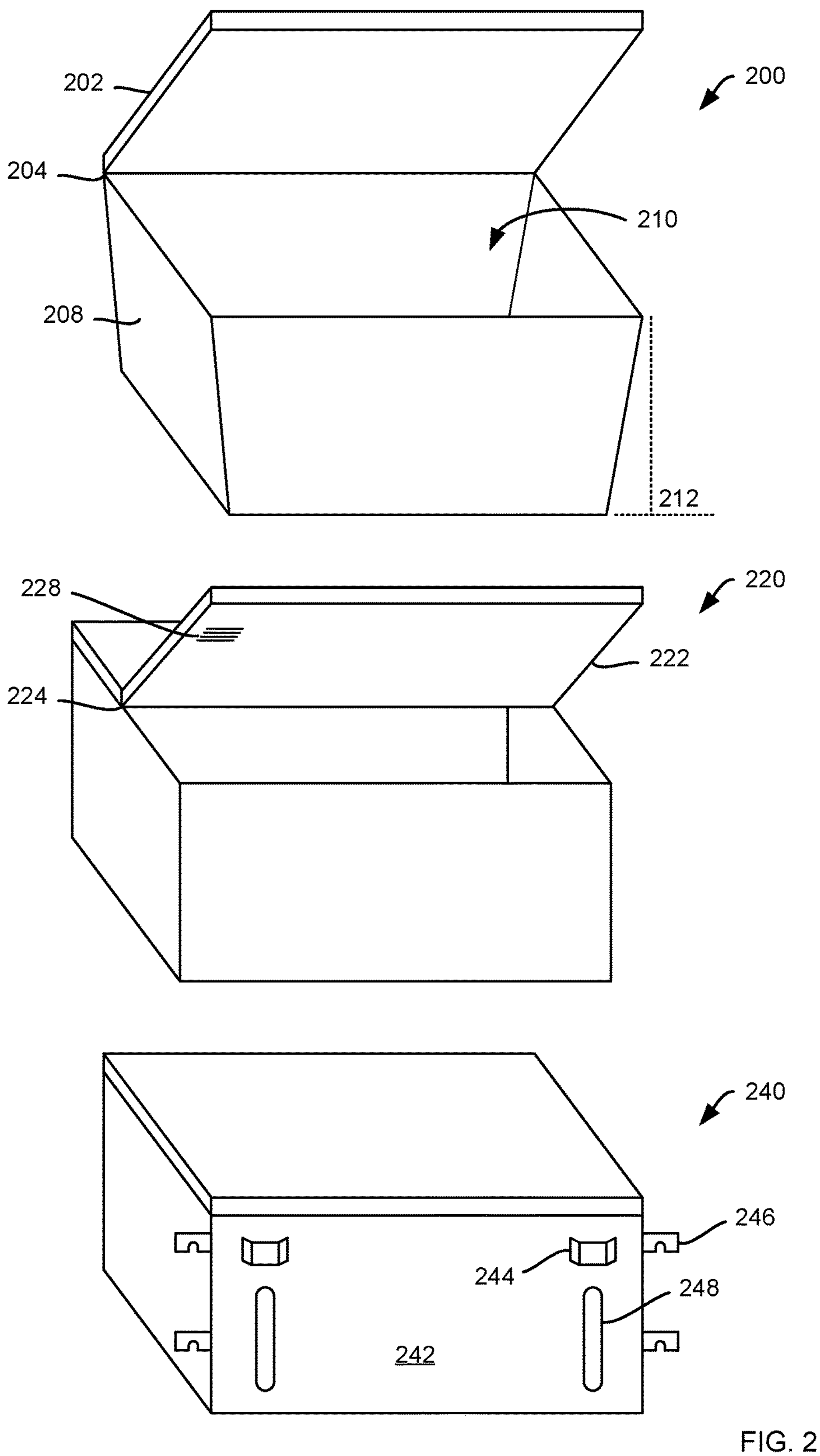
FIG. 2 is an illustrative representation of various lid and mounting elements for funnel storage systems in accordance with embodiments of the present invention.

FIG. 2 is an illustrative representation of various lid and mounting elements for funnel storage systems in accordance with embodiments of the present invention. For example, as illustrated, funnel storage system 200 may include lid 202 removably coupled with cabinet enclosure 208 having upper opening 210. In embodiments, lid 202 may form a dust seal with cabinet enclosure 208 provided to keep funnels clean during drainage and storage. In the illustrated embodiment, lid 202 may be hinged along edge 204. However, lids may additionally be removably coupled with cabinet enclosure embodiments in any manner known in the art without departing from embodiments disclosed herein. In some embodiments cabinet enclosures may include angled side walls as indicated by perpendicular dashed lines 212. Angled sidewalls may be provided so that multiple cabinet enclosures may be nested during shipping. Typically angled sidewalls may be angled in a range of approximately 5 to 20 degrees in embodiments.

Further illustrated is funnel storage system 220 that may include lid 222 having hinged joint 224 positioned forward from the back edge of lid 222. A hinged joint embodiment, such as illustrated, may allow a lid to swing fully open without having to support the lid while loading and unloading funnels. Hinged joint embodiments may be positioned along the lid in any suitable location without limitation. In addition, as illustrated, in some embodiments lids may include vent 226. In some examples, volatile solvents may be utilized. A vented lid will allow these solvents to vent into the atmosphere so that explosive vapor does not collect. In some embodiments, vents may be coupled with an air evacuation system to vent vapors out of the work environment. Vents may be placed in any suitable location along the lid or cabinet enclosure without limitation.

Still further illustrated is funnel storage system 240. The illustrated representation is a back view of funnel storage system 240 showing back panel 242 and presents various manners by which funnel storage systems may be mounted on a vertical surface. These mounting elements may be utilized separately or in combination without limitations and are provided by way of example and should not be construed as limiting. As illustrated, funnel storage system 240 may include back mounting tab 244, side mounting tab 246, and magnet 248. Back mounting tab embodiments may be configured to receive a hook or vertical tab on a vertical surface. Likewise side mounting tab embodiments may be configured to receive a screw, bolt, or pin on a vertical surface. Magnet embodiments may be readily coupled with a magnetically receptive vertical surface. In embodiments, magnets may be electro-magnets or permanent magnets without limitation.

Figure 3:
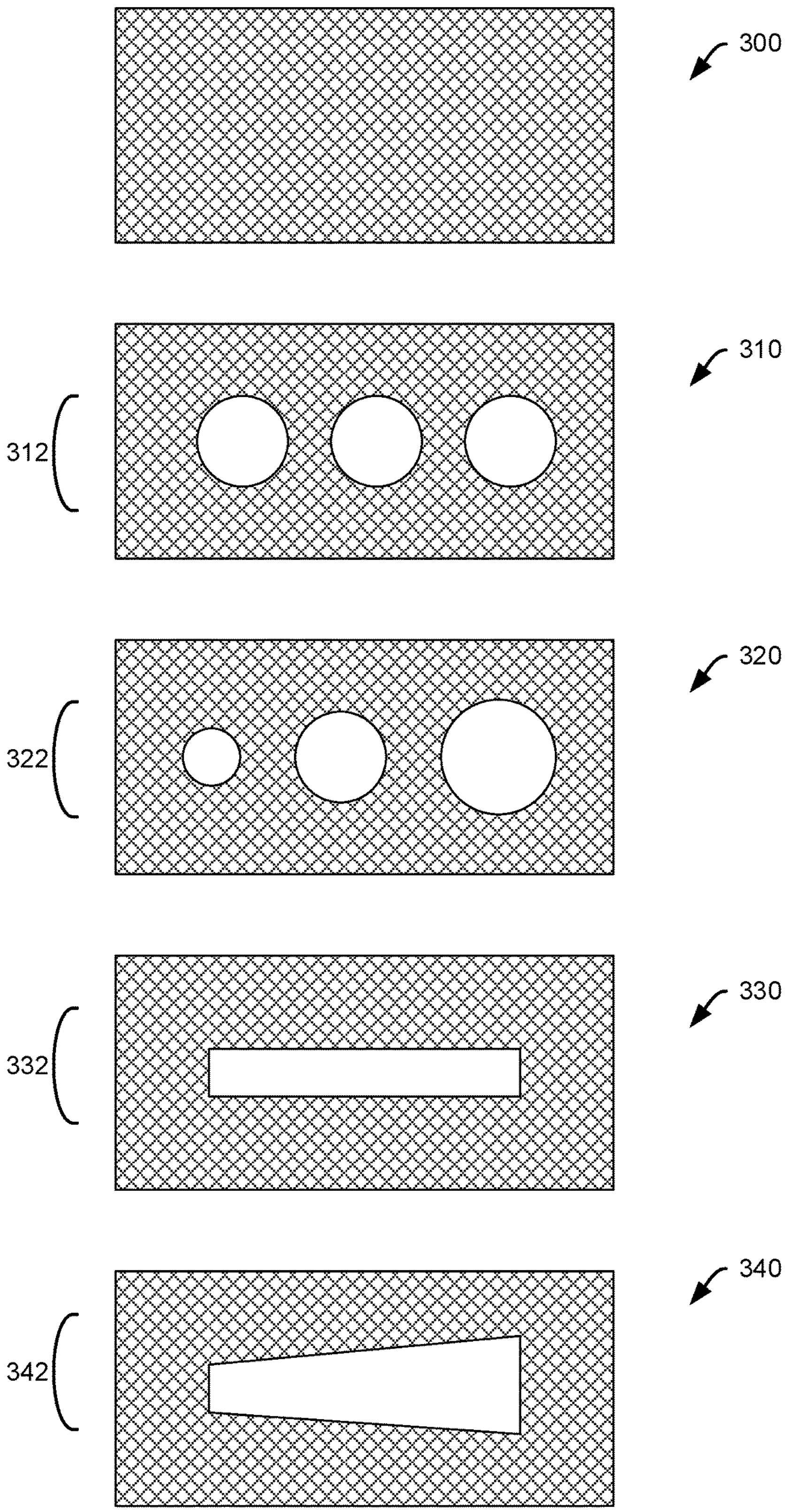
FIG. 3 is an illustrative representation of various top screened supports for funnel storage systems in accordance with embodiments of the present invention.

FIG. 3 is an illustrative representation of various top screened supports for funnel storage systems in accordance with embodiments of the present invention. In general, top screened supports are useful for allowing funnels to drain. Typically, when using a funnel, some fluidic residue remains on the side walls of the funnel. If the funnel is placed on a shelf for storage, the fluid runs onto the shelf which may damage the shelf or items on or below the shelf. It may be useful to provide a designated area for allowing drainage of the funnel where the residues may be safely and cleanly contained. Top screened supports may be removably or permanently coupled with cabinet enclosure embodiments in any manner known in the art without limitation. Further, top screened supports may be manufactured from a mesh or hardware cloth that allows fluids to drain, but provides support for the funnels. As illustrated, top screened support 300 includes no pre-cut openings and therefore may be custom cut or cut-to-fit by a user. For top screened support 310, circular pre-cut openings 312 having similar sizes may be implemented for receiving a funnel and for maintaining the funnel in a stable vertical orientation such that fluids are drained from the funnel. In some embodiments, pre-cut openings may be vertically off-set from upright storage posts which will be discussed in further detail below for FIG. 4. In other embodiments, pre-cut openings may be vertically aligned with upright storage posts. By off-setting pre-cut openings from upright storage posts, drainage onto stored funnels may be avoided. For top screened support 320, circular pre-cut openings 322 having different sizes may be implemented for receiving a funnel and for maintaining the funnel in a stable vertical orientation such that fluids are drained from the funnel. Further, for top screened support 330, pre-cut opening 332 having a rectangular shape may be implemented for receiving a funnel and for maintaining the funnel in a stable vertical orientation such that fluids are drained from the funnel. Still further, for top screened support 340, pre-cut opening 342 having a trapezoid shape may be implemented for receiving a funnel and for maintaining the funnel in a stable vertical orientation such that fluids are drained from the funnel. These different pre-cut openings may be utilized separately or in combination without limitation in embodiments. One skilled in the art will understand that funnels are manufactured in a variety of shapes and sizes and thus top screened embodiments illustrated are for clarity in understanding various configurations and should not be construed as limiting.

Figure 4:
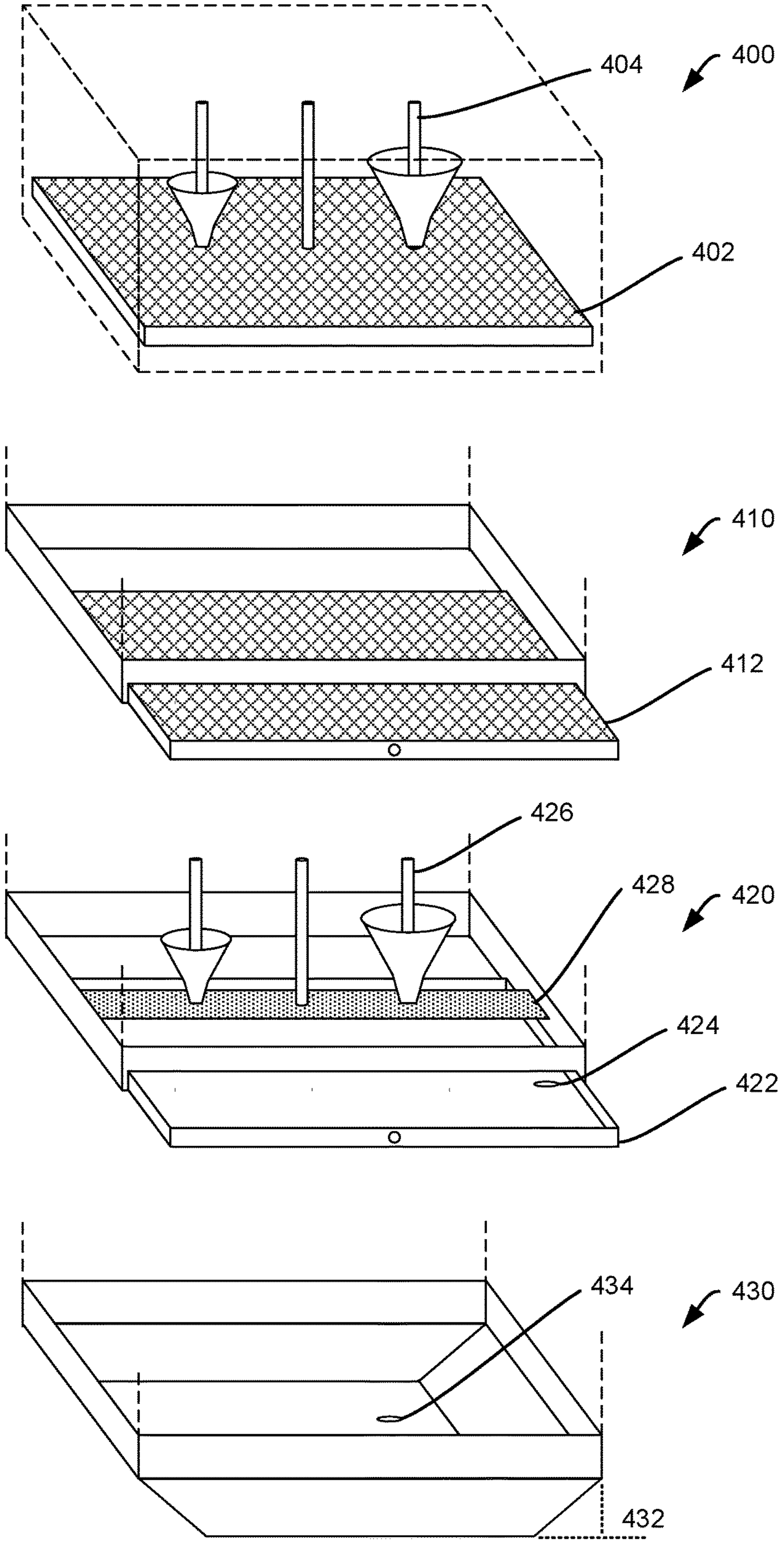
FIG. 4 is an illustrative representation of various bottom screened supports and drawers for funnel storage systems in accordance with embodiments of the present invention.

FIG. 4 is an illustrative representation of various bottom screened supports and drawers for funnel storage systems in accordance with embodiments of the present invention. Once a funnel has been drained of fluids, it may be desirable to store the funnel in a clean, dust free environment. It may be appreciated that even though fluids have been drained, a film may remain on a funnel that may attract dust or dirt requiring additional cleaning before use. As such, present embodiments provide various manners in which to store funnels. As illustrated, cabinet enclosure 400 may include bottom screened support 402. As above, bottom screened supports may be removably or permanently coupled with cabinet enclosure embodiments in any manner known in the art without limitation. Further, bottom screened supports may be manufactured from a mesh or hardware cloth that allows fluids to drain while providing support for the funnels. In the illustrated embodiment bottom screened support 402 further includes upright storage posts 404 for storing and organizing a number of funnels. As illustrated, the three upright storage posts are aligned, however any number of upright storage posts in any position may be provided without departing from embodiments herein. Further, upright storage posts may include a variety of diameters and lengths without departing from embodiments herein.

Further as illustrated, cabinet enclosure 410 may include drawer 412. Drawers may be provided so that drained fluids or debris may be easily removed. Drawer embodiments may be slidingly coupled with cabinet enclosures in any manner known in the art without limitation. As illustrated, drawer 412 may be fitted with a mesh or hardware cloth that allows fluids to drain, but provides support for the funnels. Still further illustrated, cabinet enclosure 420 may include drawer 422 as well as upright storage posts 426 positioned along cross-support 428. Drawer 422 may further include drawing hole 424 for draining fluids. Drain holes may be positioned anywhere along the drawer bottom. In some embodiments, drain hole embodiments may be fitted with a drain plug, a valve, or a spigot for added convenience in removing drained fluids without limitation. Still further illustrated, cabinet enclosure 430 may include partial angled sidewall as indicated by perpendicular dashed lines 432. Unlike angled sidewalls disclosed above, partial angled sidewalls are only angled on a lower portion of cabinet enclosures. Partial angled sidewalls may be desirable to direct drained fluids toward the middle of the bottom of a cabinet enclosure. Partial angled sidewalls may be angled in a range of approximately 15 to 45 degrees in embodiments. Cabinet enclosure 430 may further include drain hole 434. Drain holes may be positioned anywhere along the cabinet enclosure bottom panel. In some embodiments, drain hole embodiments may be fitted with a drain plug, a valve, or a spigot for added convenience in removing drained fluids without limitation.

As may be appreciated, the illustrated various bottom screened supports and drawers for funnel storage systems may be configured in a variety of configurations and combinations without limitation and without departing from embodiments disclosed herein.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A funnel storage system comprising:

a cabinet enclosure having an upper opening;

a lid removably coupled with the cabinet enclosure, the lid forming a dust seal with the cabinet enclosure;

a planar top screened support coupled with the cabinet enclosure for receiving and supporting a plurality of funnels, wherein the top screened support further comprises one or more pre-cut openings for receiving a funnel and for maintaining the funnel in a stable vertical orientation such that fluids are drained from the funnel; and a planar bottom screened support coupled with the cabinet enclosure for storing and organizing the plurality of funnels along a plurality of upright storage posts vertically aligned with the one or more pre-cut openings, wherein the plurality of upright storage posts receives the plurality of funnels through a plurality of funnel stems.

2. The funnel storage system of claim 1, wherein the cabinet enclosure further comprises angled side walls such that a second cabinet enclosure having angled side walls may be nested within the cabinet enclosure.

3. The funnel storage system of claim 1, wherein the cabinet enclosure further comprises:

a hanging element positioned along a back panel of the cabinet enclosure such that the funnel storage system may be mounted on a vertical surface, wherein the hanging element is selected from the group consisting of: a magnet, a side hanging tab, and a back hanging tab.

4. The funnel storage system of claim 1, wherein the lid further comprises a hinged joint positioned forward from a back edge of the lid.

5. The funnel storage system of claim 1, wherein the lid is vented.

6. The funnel storage system of claim 1, wherein the cabinet enclosure is vented.

7. The funnel storage system of claim 1, wherein the one or more pre-cut openings are vertically off-set from the plurality of upright storage posts.

8. The funnel storage system of claim 1, wherein the bottom screened support further comprises a cross-support for supporting the plurality of upright storage posts.

9. The funnel storage system of claim 1, further comprising:

a drawer slidingly coupled with the cabinet enclosure for receiving drained fluids.

10. The funnel storage system of claim 9, wherein the drawer further comprises:

a drain hole; and a drain plug for removing drained fluids.

11. The funnel storage system of claim 1, wherein in the cabinet enclosure further comprises:

a bottom panel having a drain hole and a drain plug for removing drained fluids.

* * * * *